United States Patent [19]

Kamichik

[11] 4,418,330
[45] Nov. 29, 1983

[54] ELECTRONIC SEQUENTIAL COMBINATION LOCKING DEVICE

[76] Inventor: Stephen Kamichik, 1460 Montcalm St., Chomedey, Quebec, Canada

[21] Appl. No.: 299,328

[22] Filed: Sep. 4, 1981

[51] Int. Cl.³ .............................................. B60R 25/04
[52] U.S. Cl. ................... 340/64; 307/10 AT; 340/309.6; 340/528; 340/543; 180/287
[58] Field of Search ................... 340/63, 64, 528, 543, 340/309.6

[56] References Cited

U.S. PATENT DOCUMENTS

| | | | |
|---|---|---|---|
| 3,422,398 | 1/1969 | Rubin | 340/63 |
| 3,611,287 | 10/1971 | Hoff et al. | 340/63 |
| 3,755,776 | 8/1973 | Kotras | 340/63 X |
| 4,205,300 | 5/1980 | Ho et al. | 340/64 X |
| 4,277,777 | 7/1981 | Schulz | 340/543 X |
| 4,320,382 | 3/1982 | Roucek | 340/64 |
| 4,335,370 | 6/1982 | Scalley et al. | 340/64 |

FOREIGN PATENT DOCUMENTS 10084  1/1979  European Pat. Off. .............. 340/64

Primary Examiner—David L. Trafton
Attorney, Agent, or Firm—Swabey, Mitchell & Houle

[57] ABSTRACT

An electronic sequential combination locking device comprising a main switch to which a timer circuit is connected. The timer circuit is activated by the main switch to provide a timer output signal after a predetermined time lapse. An electronic switch means is connected to receive the timer output signal. An alarm is connected to the electronic switch means and is operable by the presence of the timer output signal. A combination lock circuit having a plurality of manually actionable switches is operable in a predetermined sequence to activate a supply switch and disable the electronic switch. The supply switch provides a supply to an operable means.

11 Claims, 2 Drawing Figures

ELECTRONIC SEQUENTIAL COMBINATION LOCKING DEVICE

BACKGROUND OF INVENTION (a) Field of Invention

The present invention relates to an electronic sequential combination locking device utilizing a plurality of manually actionable switches operable in a predetermined sequence in order to activate an operable device when the sequence of switches are activated within a predetermined time limit.

(b) Description of Prior Art

Various electronic anti-theft circuits are known to prevent automobile theft or to prevent entrance within an enclosure through a closure device, such as a door. However, some disadvantages of this known prior art are that the circuits are expensive to construct and utilize special components and in some cases the circuitry is easily defeated by expertise. Other disadvantages of known circuits are that the device will permit a vehicle to be started and the alarm is sounded only after a predetermined time lapse after the vehicle is in motion. Therefore, this would permit theft by transporting the vehicle in a transport vehicle. A further disadvantage of some prior art circuits is that they handle only very light loads and cannot trigger a multitude of alarm devices. A further disadvantage is that the device can be circumvented by jumping wire connections.

SUMMARY OF INVENTION

It is a feature of the present invention to provide an improved electronic sequential combination locking device which substantially overcomes all of the disadvantages.

Another feature of the present invention is to provide an electronic sequential combination locking device which can handle various types of alarms, which is economical to construct, easy to install, and which may be used with automobiles, aviation and aerospace devices, and for the protection of domestic enclosures.

According to the above features, from a broad aspect, the present invention provides an electronic sequential combination locking device comprising a main switch with a timer circuit connected thereto through a first relay device. The timer circuit is activated by the main switch to provide a timer output signal after a predetermined time lapse. An electronic switching element is connected to receive the timer output signal. An alarm means is connected to the electronic switching element and operable by the timer output signal. A combination lock circuit having a plurality of manually actionable switch circuits is operable in a predetermined sequence to activate a second relay device and disable the electronic switching element through a feedback connection between the first and second relay devices. The electronic switching element when activated by the timer output signal after the time lapse applies power to the first relay device which activates the alarm means and disables the combination lock circuit. The supply switch provides a supply to an ignition circuit of an automobile. The second relay device has two sets of contacts through which power is supplied to the ignition circuit when the second relay device is activated and the alarm means is simultaneously disabled.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
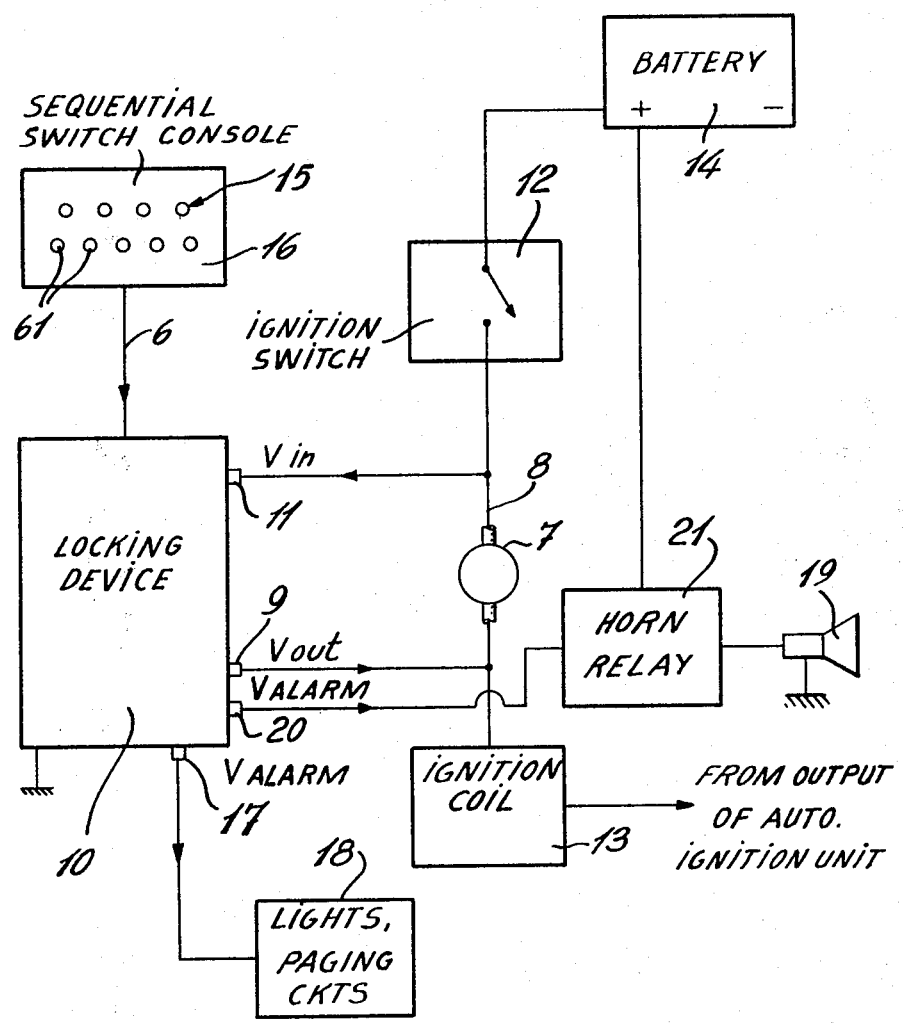
FIG. 1 is a block diagram showing the location of the electronic sequential combination locking device of the present invention as utilized with an automobile ignition system.

Referring now to the drawings and more particularly to FIG. 1, there is shown generally at 10 the electronic sequential combination locking device of the present invention. The input voltage to the device 10 is connected at the input terminal 11 and taken across the 12-volt line 8 leading from the automobile ignition switch 12 to the ignition coil 13. The output terminal 9 of the device 10 is also connected to the line 8 which is open-circuited at 7. A battery 14 supplies power to the ignition switch 12 and the line 8.

The electronic sequential combination locking device 10 is rendered operative by a combination lock circuit utilizing a plurality of manually actionable switch 15 mounted on a console 16, which is conveniently secured to the dashboard of an automobile. To activate the device 10 a predetermined sequence of these switches is depressed within a predetermined time determined by a timer circuit located within the device 10. With the proper combination code depressed, continuity is achieved between the input terminal 11 and output terminal 9 thereby providing power to the ignition coil 13 or +12 V of an electronic ignition unit (not shown) or electronic fuel injection unit (not shown) etc., permitting an automobile to start.

The device 10 is provided with a first output connection 17 which activates an alarm device 18 which can be of any suitable form such as the lights of an automobile, a paging receiver, or a horn relay of a vehicle. The horn 19 of the vehicle is activated by a signal at the output 20 which provides a pulsating signal to a horn relay 21, thus providing a pulsating 12-volt signal to the horn.

Figure 2:
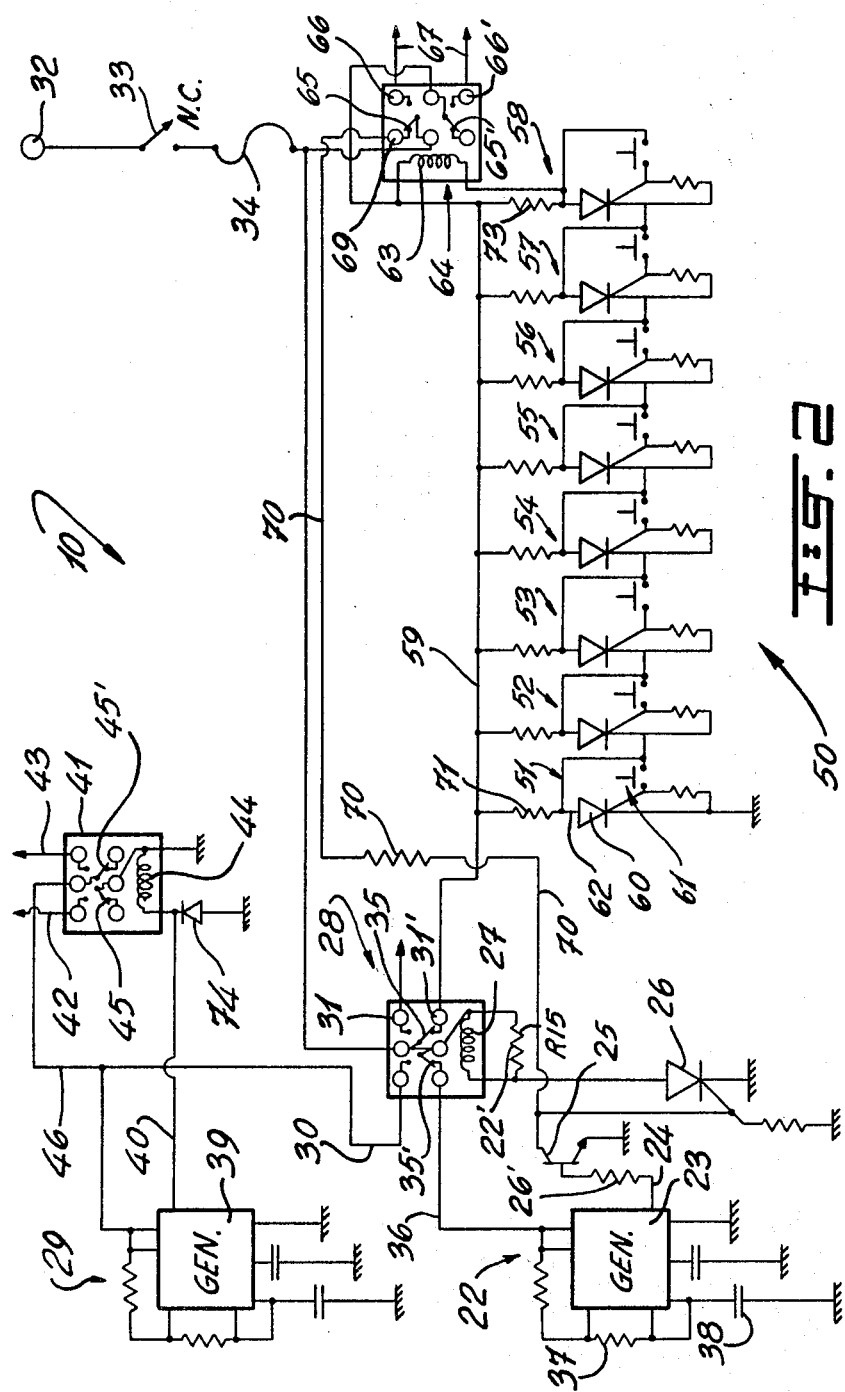
FIG. 2 is a detailed schematic view showing the construction of the electronic sequential combination locking device of the present invention.

Referring now to FIG. 2, there is shown the construction of the electronic sequential combination locking device 10 and it consists of a timer circuit 22 which has an astable square wave generator 23 having an output connection 24 connected to the base of transistor 25 through a biasing resistor 26'. The transistor 25 acts as an inverting switch which supplies the positive pulse required to fire the silicon control rectifier 26. The rectifier 26 applies the power to the winding 27 of a relay device 28.

An alarm circuit 29 is connected to a first contact 30 of a first set of contacts of the relay device 28. The other contact 31 of that same set connects to a further alarm circuit which may be, for example, the light circuit of a vehicle or a paging transmitter. Power to this device is provided from the power source connection 32 which connects through switch 33 and fuse 34 to the contact arms 35 and 35' of the relay device 28. Thus, when the contact arms are in their upper position the alarms are triggered. When the contact arms are in their initial position as shown in FIG. 2, the power supply terminal 32 is connected to the astable square wave generator 23 through connection 36 to supply power thereto. The period of the timer circuit is controlled by a resistor 37 and capacitor 38. The power source is also applied to the relay coil 27 through the relay device 28 at all times to permit the relay device to be enabled.

The alarm circuit 29 is comprised of a beeper circuit constituted by a square wave signal generator 39 connected at an output 40 thereof to a beeper relay device 41. The square wave generator 39 produces a square wave output signal to the relay device 41 to activate an alarm device with a pulsating tone. In this particular instance the alarm device would be connected across the output connections 42 and 43 and would be constituted by the horn of the vehicle, if the device 10 was connected as an automobile anti-theft device. As can be seen from the circuit, the output connection 40 provides the necessary supply to the relay coil 44 which causes the switch contacts 45 and 45' to switch on and off thereby providing a pulsating output. The supply is taken through a connection 46 via the relay device 28 which receives its power from supply terminal 32.

The device also comprises a combination lock circuit 50 having a plurality of manually actionable switch circuits 51 though 58 connected to the power supply line 59 through the relay contact 35 of relay device 28 and back to the supply terminal 32. Each electronic switch circuit 51 to 58 is comprised of a silicon control rectifier 60 which is fired by closing an N.O. switch contact 61 whereby the anode 62 of the rectifier 60 is grounded or brought to a very low potential. When the switch contacts 61 associated with the switch circuits 51 through 58 are depressed in a predetermined sequence the power supply will be connected to the relay coil 63 of the supply relay device 64 causing its contact arms 65 and 65' to engage a respective one of contacts 66 and 66' whereby connecting the power supply terminal 32 to the output connections 67 which are connected in the ignition switching circuit, as described with reference to FIG. 1.

It is pointed out that switch 33 is normally contained on the console 16 with the N.O. switch contacts 61 and depressed in sequence whereby the supply can be provided to the output terminal 67. Should the switching circuits 51 to 58 be depressed in the wrong order, then the relay coil 63 will not energize the relay device 64 and after the predetermined count of the timer device 22 the relay coil 27 will be energized causing the alarms to trigger. Should the relay coil 63 be energized within the proper sequence, the timer device is disabled as the power supply connection line 70 becomes disconnected as terminal 69 of relay 64 is no longer engaged with the switch arm 65 to which the power supply is connected. Thus, power is removed from transistor 25 and therefore preventing the relay device 28 from latching. The power line 59 is connected to the contact arm 35 and the contact 31' to the power supply and to one of the output connections 67 through contact arm 65' of relay 64.

Resistances 71 in each of the switch circuits 51 through 58 are chosen so that ample anode current is available to ensure reliable (holding) current for each silicon control rectifier 60. Resistances 22' and 73 connected across relay coil 27 and 63 of relay devices 28 and 64 respectively are also chosen so that sufficient current is available to ensure reliable latching and holding of the relays. This precaution is necessary with inductive loads such as relay coils. For the same reason, diode 74 is used on the beeper relay device 41 to reduce the possible reverse inductive spike voltage or current.

I claim:

1. An electronic sequential combination locking device comprising a main switch, a timer circuit connected to said main switch through a first relay device, said timer circuit being activated by said main switch to provide a timer output signal after a predetermined time lapse, an electronic switching element connected to receive said timer output signal, alarm means connected to said electronic switching element and operable by said timer output signal, a combination lock circuit having a plurality of manually actionable switch circuits operable in a predetermined sequence to activate a second relay device and disable said electronic switching element through a feedback connection between said first and second relay devices, said electronic switching element when activated by said timer output signal after said time lapse applying power to said first relay device which activates said alarm means and disables said combination lock circuit, said second relay device providing a supply to an ignition circuit of an automobile, said second relay device having two sets of contacts through which power is supplied to said ignition circuit when said second relay device is activated and said alarm means is simultaneously disabled.

2. The device of claim 1 wherein said timer output signal is connected to an inverting switch transistor which supplies a positive pulse to said electronic switching element.

3. The device of claim 2 wherein said timer circuit comprises an astable square wave generator producing said output signal, said electronic switching element is a silicon control rectifier which is connected to the winding of said relay device, said first relay device having two sets of contacts to supply power to said timer and said combination lock when said first relay device is not activated by said silicon control rectifier and to supply power to said alarm means when activated.

4. The device of claim 3 wherein said alarm means comprises a beeper circuit which is a square wave signal generator connected at an output thereof to a beeper relay device, said square wave generator producing a square wave output signal to said beeper relay device to activate an alarm device.

5. The device of claim 4 wherein said alarm means further comprises a connection through one of said sets of contacts of said first relay device connected to one or more further alarm devices.

6. The device of claim 5 wherein said alarm device connected to said beeper relay device is a vehicle horn, said further alarm device being a vehicle light circuit.

7. The device of claim 1 wherein said manually actionable switch circuits comprise a plurality of electronic switches connected in a power supply line to provide power to a winding of said second relay device.

8. The device of claim 7 wherein there is further provided a power disconnecting switch connected in said supply line to disconnect said power supply when activated.

9. The device of claim 7 wherein said plurality of electronic switch circuits comprise a silicon control rectifier which is fired by closing a switch contact associated therewith whereby an anode of said rectifier is grounded.

10. The device of claim 7 wherein said operable means is an electromagnet operating a locking bolt for securing a closure means to prevent access to an enclosure.

11. The device of claim 1 wherein said main switch is a vehicle key operated ignition switch.

* * * * *